United States Patent Office 3,410,831
Patented Nov. 12, 1968

3,410,831
ANIONIC PROCESS FOR PREPARING REINFORCED POLYLACTAM IN THE PRESENCE OF A COUPLING AGENT AND A TETRAALKYL ORTHOSILICATE
Ross M. Hedrick and Paul A. Tierney, St. Louis, Mo., assignors to Monsanto Company, a corporation of Delaware
No Drawing. Filed Feb. 10, 1964, Ser. No. 343,506
12 Claims. (Cl. 260—78)

This invention relates to reinforced polymer compositions and to an improved process for preparing these compositions. More particularly this invention relates to the use of tetraalkyl orthosilicates as surfactants and mold release agents in the preparation of reinforced polymeric compositions.

It is an object of this invention to provide an improved process for preparing polymeric compositions containing major quantities of reinforcing agents.

Another object of this invention is to provide surfactant materials that reduce the surface tension and lower the viscosity of monomers and prepolymers containing major quantities of reinforcing agents.

Another object of this invention is to provide mold release agents that can be incorporated into monomeric and prepolymeric compositions and which migrate to the interface of the polymer-mold surface to provide an effective mold release.

It is a further object of this invention to provide reinforced polymeric compositions having increased flexural strength and modulus.

Yet another object of this invention is to provide tetraalkyl orthosilicates which possess a dual function as surfactants and as mold release agents in the preparation of polymeric compositions containing a major proportion of reinforcing agent.

It is another object of this invention to provide an improved process for preparing reinforced polylactam compositions containing major quantities of reinforcing agents.

The terms reinforcing agent and reinforcing medium apply to those substances whose incorporation into a polymer system provides enhancement of the mechanical properties of the product, achieved at least in part by incorporation of a coupling agent, in distinction to materials which serve only as fillers or diluents. Since the reinforcement produced by the practice of this invention is achieved by chemical bonding, the terms reinforced polymeric composition and reinforced polymer refer to those compositions comprising a polymer and reinforcing agent wherein the reinforcing agent is chemically bound to the polymer through a third component referred to as a coupling agent. A coupling agent is a compound containing two or more reactive groups, at least one of which is capable of reaction with the polymer, and at least one of which is capable of reaction with a reinforcing agent.

It is known that polymeric compositions can be filled with non-polymeric substances, i.e. materials which do not enter into the polymerization process can be mixed with the monomer feed or polymeric product to form uniform finished products. The upper limit of filler that can be used in such mixtures without adversely affecting the mechanical properties of the product is low. The tensile and flexural strengths tend to fall off sharply at relatively low concentrations of filler. It has now been discovered that a polymer and inorganic mineral can be chemically bound so that the inorganic material no longer functions as a mere filler but actually becomes part of the polymeric composition. The proper combination of polymer and reinforcing agent is achieved through a third component known as a coupling agent. The mechanical properties of the polymer do not decrease with increasing proportions of filler when a proper coupling agent is employed, but instead are improved significantly at high proportions of reinforcing agent.

Although fibrous glass can be used in certain polymers to increase tensile and flexural strengths without the concurrent use of a coupling agent, these product improvements have not been obtained by the use of granular materials. The reason granularly filled polymers exhibit decreased strength is due to the fact that a particulate filler in a polymer is not comparable to the polymer in load-bearing characteristics. Rather the polymeric constituent is primarily determinative of the tensile and flexural strengths and moduli of the composition. Therefore a filled polymeric product which contains less polymer per unit volume of the product than an unfilled polymer, ordinarily possesses physical properties inferior to the unfilled polymer, particularly at granular filler concentrations of about 50% or more. The reinforcement of polymeric compositions by means of granular particles as distinguished from fibrous particles is desirable since a granular mineral-monomer or prepolymer mixture is more fluid, hence more easily cast or molded, than a mixture containing an equivalent amount of a fibrous material.

The polymeric compositions of this invention comprise polyamides reinforced with inorganic minerals which are chemically bound to the polyamide through coupling agents, which coupling agents contain at least one group, preferably a primary or secondary amino group, capable of reaction with the polyamide and at least one group, preferably a substituted oxysilane group, i.e.

where Z is a hydrolyzable radical, capable of reaction with the mineral. A preferred oxysilane group for use in this invention is a tri-substituted trioxysilane group, i.e. —Si(OZ)₃.

The polyamides useful in the compositions prepared according to this invention are produced in a base-catalyzed, substantially anhydrous polymerization of lactam monomers. Suitable lactam monomers that can be used are characterized by the general formula

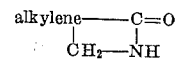

wherein the alkylene group contains from 2 to 11 carbon atoms. A preferred monomer is ε-caprolactam. Lactam monomers in addition to ε-caprolactam include α-pyrrolidone, piperidone, valerolactam, caprolactams other than the ε-isomer, methyl cyclohexanone isoximes, cyclooctanone isoxime, cyclodecanone isoxime, cyclododecanone isoxime, etc. U.S. 3,017,392 describes a lactam polymerization which is useful in making the compositions of this invention. U.S. 3,017,391, U.S. 3,018,273, and U.S. 3,028,369 describe alternative procedures and modifications which can be incorporated into our inventive process. It is understood that this invention is applicable to all base-catalyzed, substantially anhydrous amide polymerizations. A specific polyamide to which this invention is particularly applicable is polycaprolactam (commonly known as nylon 6).

The polyamides may be linear or crosslinked. We have found that a crosslinked polyamide provides some improvement in physical properties, particularly impact strength, but linear polyamides can also be reinforced by our process. The maximum amount of tolerable crosslinking in the polymer depends upon the proposed use of the finished composition. Increased crosslinking produces compositions with high impact resistance and with somewhat reduced flexural strength and modulus. Consequently, control of crosslinking provides a variable which enables one to tailor the polyamide to produce a composition of the desired properties. The minimum amount of crosslinking is that which is necessary to provide a polyamide with an effective molecular weight around 10,000 or more, preferably 12,000 or more. Therefore a linear polyamide with a molecular weight around 10,000 or more need not be crosslinked whereas a lower molecular weight polymer, e.g. a polymer with a molecular weight of 5,000 or less, would be better utilized in the practice of this invention if it were subsequently cross-linked to provide a composition wherein the polymeric constituent has an effective molecular weight around 10,000 or more. Suitable cross-linking agents are well known in the art and can be used here in the conventional manner. Two compounds which we have used in conjunction with polyfunctional promoters include polyethyleneimine and tetra-(3-aminopropoxymethyl)methane. In addition, crosslinking can be achieved through the coupler by hydrolysis of silanol groups to form silxane linkages, i.e.

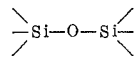

and by the use of polyfunctional promoters such as di- and tri-isocyanates.

Although the present invention is preferably conducted with reinforced polylactams, we can use the tetraalkyl orthosilicates as surfactants and mold release agents for the preparation of other reinforced polymers. Examples of polymer systems which can be used include the polyesters, polyurethanes, polycarbonates, the epoxy resins, styrene resins such as polystyrene, styrene/acrylonitrile copolymer, styrene/butadiene copolymer, styrene/acrylonitrile/butadiene terpolymer, phenolformaldehyde, the phenolformaldehyde resins, aminoplasts such as the urea resins and the melamine resins, polyglycols, and the other polymerization systems which can utilize a promoter, regulator, inhibitor, stabilizer, or other additive which is chemically incorporated into the polymer chain during the polymerization reaction.

The reinforcing agents of the present invention can be selected from a variety of minerals, primarily metals, metal oxides, metal salts such as metal aluminates and metal silicates, other siliceous materials, and mixtures thereof. Generally, those materials which have or can acquire an alkaline surface upon treatment with a base are best suited for the reinforced polymeric compositions. Since metal silicates and siliceous materials usually have or can readily acquire the desired alkaline surface, a preferred mineral mixture for use in this invention is one which contains a major amount, i.e. more than 50% by weight, of metal silicates or siliceous materials. Materials with such characteristics are preferred because of the ease with which they can be coupled to the polymer. However, other substances such as alumina, which are coupled to a polymer by the use of higher levels of coupling agents, can be used as reinforcing components either singly or preferably combined with other minerals which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a feldspar-alumina mixture is also useful. Other materials particularly preferred as reinforcing agents are those materials with an alkaline surface such as wollastonite, which is a calcium metasilicate; asbestos, such as chrysotile, a hydrated magnesium silicate; crocidolite; and other calcium magnesium silicates. Other useful reinforcing agents include: quartz and other forms of silica, such as silica gel, glass fibers, cristobalite, etc.; metals such as aluminum, tin, lead, magnesium, calcium, strontium, barium, titanium, zirconium, vanadium, chromium, manganese, iron, cobalt, nickel, copper, and zinc; metal oxides in general, such as oxides of aluminum, tin, lead, magnesium, calcium, strontium, barium, titanium, zirconium, vanadium, chromium, manganese, iron, cobalt, nickel, copper, and zinc; heavy metal phosphates, sulfides and sulfates in gel form; and minerals and mineral salts such as spodumene, mullite, mica, montmorillonite, kaolinite, bentonite, hectorite, beidellite, attapulgite, chrysolite, garnet, saponite and hercynite.

The term mineral is used to include all the classes of inorganic materials described above; consequently the term mineral is used synonomously with reinforcing agent to include all the classes of inorganic materials defined by the above examples, whether naturally occurring or synthetically produced.

The amount of reinforcing agent to be used in the preparation of the polymeric composition can vary over a wide range with the maximum content being limited primarily by the ability of the polymer to bind the reinforcing medium into a cohesive mass. Techniques subsequently described herein have enabled us to prepare polymeric compositions containing as much as 90 or 95% by weight reinforcing agents.

The lower range of reinforcing mineral concentrations is limited only insofar as it is necessary to have sufficient mineral present to effect an improvement in physical properties of the polymeric composition. Consequently, mineral concentrations as low as 5% by weight or less can be used, particularly if the finished composition has been extruded into filament form. A preferable lower limit for the mineral reinforcing agent, especially in the case of molded compositions, is 40% by weight of the total composition, and more preferably 50% by weight. Suitable values for reinforcing agent concentration in the finished composition range from about 5 to 95%, preferably from about 40 to 95%, and more preferably from about 50 to 90% by weight.

Particle shape and size of the reinforcing agent affect physical properties of the finished composition. In a preferred aspect of this invention the reinforcing mineral is admixed with a monomer or prepolymer and subsequently cast into a mold where the polymer is formed and cured. In such a method, the viscosity of the monomer or prepolymer-mineral slurry becomes a limitation on the maximum amount of reinforcing agent which can be used, i.e. too high a mineral concentration produces mixtures too viscous to cast into molds. This limitation on mineral concentration imposed by the viscosity is partly dependent upon the shape of the particulate mineral. For example, spherical particles do not increase the viscosity of the monomer mixture as much as fibrous materials. By adjusting the particle shape of a mineral reinforcer and thereby controlling the viscosity of the monomer mixture, it is possible to prepare improved castable or moldable polymeric compositions containing a very large amount of reinforcing mineral.

Another factor which has an effect on the upper limit of mineral concentration is the particle size distribution of the mineral. A wide distribution of particle sizes provides a composition with a small amount of voids or spaces between the particles, thereby requiring less polymer to fill these spaces and bind the particles together. Proper combination of the two variables of particle shape and size distribution enables us to prepare highly reinforced compositions containing a major proportion of reinforcing agent.

Particle size distribution is a variable which has an effect on the degree of mineral loading possible. Generally particles which pass through a 60 mesh screen are small enough to be used in the compositions of this invention. Particles as large as 1,000μ (18 mesh) can be used with equal or nearly equal success, and particles as small as 0.5μ have been successfully employed and particles in the range of 200 to 400 millimicrons can also be used. More descriptive of suitable mineral particles than limits on particle size is a specification of particle size distribution. A suitable wide particle size distribution is as follows:

100%—250μ or less (60 mesh)
90%—149μ or less (100 mesh)
50%—44μ or less (325 mesh)
10%—5μ or less.

A narrower distribution also suitable for use in this invention is:

100%—62μ or less (230 mesh)    50%—11μ or less
90%—44μ or less (325 mesh)     10%—8μ or less.

A relatively coarse mixture useful in this invention has the following particle size distribution:

100%—250μ or less (60 mesh)
90%—149μ or less (100 mesh)
50%—105μ or less (140 mesh)
10%—44μ or less (325 mesh).

A suitable finely divided mixture has the following particle size distribution:

100%—44μ or less (325 mesh)    50%—2μ or less
90%—10μ or less                10%—0.5μ or less.

These figures regarding particle size distribution should not be construed as limiting since both wider and narrower ranges of distribution will also be useful as well as both coarser and finer compositions. Rather these figures are intended as representative illustrations of mineral compositions suitable for use in preparing the reinforced polymeric compositions.

The reinforcing agents perform a dual function in the finished compositions. Depending upon the material selected they may serve as an inexpensive diluent for the polymer, thereby lowering the cost of the final product. Secondly, and more important, these minerals, when bound to the polymer through a coupling agent, produce compositions with physical properties far superior to those of unreinforced polymers, thereby permitting their use in applications heretofore unsuited for the unreinforced polymers.

To achieve the benefits of this invention, namely the production of easily castable or moldable highly reinforced polymeric compositions plus lower costs from higher loadings of reinforcing minerals, it is necessary that the reinforcing agent be substantially granular in shape rather than fibrous. However, a small amount of fibrous material may be incorporated into a polymer system if the amount of granular material is reduced by some proportionately larger amount. Alternatively, if castability is not required, larger amounts of fibrous material can be included in the composition, thereby reinforcing the final product to an even greater extent.

The most common fibrous reinforcing agent used is fibrous glass particles. These fibers are most easily incorporated into the polymeric composition when chopped into strands approximately 0.125 to 3.0 inches in length, and then either added to a prepolymer-coupler mixture as discrete particles or formed into a mat upon which the prepolymer is poured prior to polymerization. These methods of incorporation of glass fibers are known in the art and are mentioned here to demonstrate that the granularly reinforced polymers of this invention can be additionally reinforced by incorporation of fibrous materials according to techniques known in the art or according to the procedure described herein as applicable to granular reinforcing agents.

After optimum particle size distribution of the reinforcing agent is selected for a particular polymer system, it can be appreciated that an upper limit of reinforcing agent can be reached at which point the composition becomes too viscous to be poured into a mold. The viscosity of monomer-mineral slurries can be reduced by surfactants. Lowered viscosity permits the formation of a finer, smoother finish on the final product. Occasionally a finished composition with a high content of reinforcing mineral, e.g. 75% mineral, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. If a smooth finish is not a necessary feature for certain applications, then a decrease in viscosity permits incorporation of larger amounts of reinforcing agents into the monomer feed. Anionic, cationic, or nonionic surface active agents can be used to reduce the slurry viscosity and materials such as zinc stearate, long alkyl chain trimethylammonium halides, and alkylene oxide condensates of long chain fatty acids have been used successfully. However, the conventional surfactants have certain drawbacks, such as interference with the polymerization catalyst system. We have now found that the tetraalkyl orthosilicates function as surfactants and not only do not interfere with the polymerization reaction but provide a mold release function as well. These materials have the general formula $$(RO)_xSi(OR')_y$$

wherein $x$ is an integer from 1 to 2, $y$ is an integer from 2 to 3 and the sum of $x$ and $y$ is equal to 4. The formula can also be written as $$(R)_x(R')_ySiO_4$$

wherein $x$ and $y$ have the values indicated above. In either formula both R and R' represent alkyl groups of 1 to 20 carbon atoms. Thus, tetramethyl orthosilicate and tetraethyl orthosilicate can be used in the practice of this invention. Improved surface activity is obtained by using a compound within the general formula wherein the R alkyl group contains from 8 to 20 carbon atoms, and correspondingly R' contains from 1 to 4 carbon atoms. Thus suitable materials include Octyl trimethyl orthosilicate
Nonyl trimethyl orthosilicate
Decyl tripropyl orthosilicate
Undecyl triethyl orthosilicate
Dodecyl trimethyl orthosilicate $(C_{12}H_{25}O)(OH_3O)_3Si$ 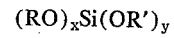
Dodecyl triethyl orthosilicate
Tridecyl tributyl orthosilicate $(C_{13}H_{27}O)(C_4H_9O)_3Si$
Tetradecyl tripropyl orthosilicate $(C_{14}H_{29}O)(C_3H_7O)_3Si$ 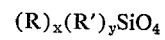
Hexadecyl triethyl orthosilicate $(C_{16}H_{33}O)(C_2H_5O)_3Si$
Octadecyl trimethyl orthosilicate
Eicosyl trimethyl orthosilicate In listing suitable compounds that can be used in the instant process, it is often convenient to use trival names for the alkyl groups to avoid ambiguity, thus certain preferred materials include Lauryl triethyl orthosilicate
Dilauryl diethyl orthosilicate
Myristyl triethyl orthosilicate
Cetyl triethyl orthosilicate
Dicetyl dimethyl orthosilicate The tetraalkyl orthosilicates would not normally be classified as surfactants in the common usage of that term, inasmuch as surfactants are considered to have a hydrophilic portion of the molecule and also a hydrophobic portion. The tetraalkyl orthosilicates are not even considered to demonstrate surface activity in aqueous systems. On the other hand it has been observed that the addition of the orthosilicate to a monomer- or prepolymer-mineral slurry reduces the surface tension of the slurry and also reduces the slurry's viscosity. An added advantage is gained by the practice of this invention. Since the viscosity is reduced, additional mineral reinforcing agent can be charged to the initial charge without sacrificing pouring characteristics. Since the alkyl silicates are liquids at the slurry's pouring temperature, it is possible to formulate slurry containing a higher proportion of mineral since the volume fraction of liquid in the slurry is increased. Furthermore, the tetraalkyl orthosilicates demonstrate a surprising activity in dispersing the mineral within the slurry, and this dispersing effect which continues as the polymerization proceeds, manifests itself in the uniformity of the reinforced polymeric compositions.

Various mold release processes can be used in the practice of our invention, but methods such as lining the mold with Teflon, or treating the mold with silicone oils or greases have inherent defects, either economically or as consumers of processing time. We have found that the tetraalkyl silicates are soluble in the monomer-mineral slurry, but that these compounds migrate to the polymer-mold interface as the polymerization occurs, forming a highly efficient "built in" mold release. The tetraalkyl silicates while soluble in a monomer such as caprolactam, are insoluble in the polymer, i.e., polycaprolactam. Thus they do not interfer with the properties of the finished composition by behaving as a solvent or plasticizer for the polymer. Thus, we obtain a multifold effect through the addition of the tetraalkyl silicate to the monomer or prepolymer-mineral composition:

(1) The tetraalkyl silicates, as inert liquids, which do not participate in the polymerization reaction, increase the initial volume fraction of liquid, but enable us to produce polymer having a higher volume fraction of reinforcing agent;

(2) The tetraalkyl silicates reduce the surface tension and viscosity of monomer-mineral slurries permitting the use of higher concentrations of mineral in the slurries, giving slurries that are easily pumped or poured into molds, or giving both advantages simultaneously;

(3) The tetraalkyl silicates, by acting as dispersion agents, prevent the minerals from settling out of the slurry in the mold, and provide for uniformly dispersed mineral in the solid product composition;

(4) The tetraalkyl silicates enable us to prepare castings having a smooth surface, free of surface defects;

(5) the tetraalkyl silicates promote the release of gas trapped within the fluid casting thus aiding in the production of strong compositions free of bubbles or voids;

(6) The tetraalkyl silicates are released from the polymerizing mass to provide a uniform mold release at the polymer-mold interface, thus saving the time required for a separate application of a mold release agent before casting the composition.

The tetraalkyl silicates are effective at concentrations as low as 0.01% by weight of the total monomer-catalyst-reinforcing agent charge, and can be used in concentrations as high as 2% by weight of the total charge; we prefer to use a concentration with the range of about 0.05% to about 1% by weight, and generally this range is between about 0.05% and about 0.75% by weight of the total polymerization system.

An essential material in the preparation of the reinforced polymeric compositions is the coupling agent which chemically binds the mineral to the polymer. A coupling agent can be characterized by its functional groups wherein one group is capable of reaction with the monomer during polymerization and at least one group is capable of reaction with the reinforcing mineral. A preferred coupling agent, for the production of polylactams, contains at least one primary or secondary amino group and at least one substituted oxysilane group, i.e.

where Z is a radical which may be removed upon hydrolysis to leave an

group. The mineral and coupler are joined by combining them in the presence of water. Presumably water hydrolyzes the Z group of the oxysilane, leaving a silanol group available for reaction with available hydroxyl groups attached to the surface of the mineral. Theoretically, these hydroxyl groups are present on the surface of, or can be deposited upon the surface of, most metallic and siliceous substances, thereby providing a site available for reaction with a hydrolyzed siloxy group, This theory of availability of hydroxyl groups on the mineral surface may explain why many silicon-containing minerals are preferred reinforcing agents since the reaction of the hydrolyzed siloxy groups of the coupler with the silanol groups, i.e.

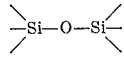

of the reinforcing agent produce the very stable siloxane linkage

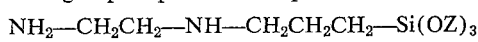

Regardless of any theoretical explanation advanced herein, to which we do not intend to be bound, the oxysilane group is attached to the mineral in the presence of water. This composition is subsequently dried. A chemical bond between the mineral and coupler is thus obtained. This reaction of mineral and coupler in the presence of water may be carried out separately, and the dried mineral-coupler adduct subsequently added to the monomer, or the reaction may be carried out in the presence of the monomer and the whole mixture dried to remove water and volatile reaction products.

An amino group is an essential part of one preferred group of coupling agents since it provides the means whereby the mineral modified with the amino-containing silane is connected through a chemical bond to the polyamide. A group of preferred couplers include $$NH_2-CH_2CH_2-NH-CH_2CH_2CH_2-Si(OZ)_3$$

and $NH_2-CH_2CH_2CH_2-Si(OZ)_3$, wherein Z can be a hydrocarbyl, acyl, or alkoxycarbonyl radical containing up to 8 carbon atoms. Other suitable couplers include 3-aminopropyl trivinyloxysilane, 4-amino-n-butyl triphenoxysilane, di - (3-aminopropyl)-di-(p-toloxy)silane, 3-aminopropyl triacetosilane, β-aminoethyl trimethoxysilane, 3,4-epoxybutyl triethoxy silane, 3-isocyanatopropyl triethoxysilane, 3-hydroxypropyl trimethoxysilane, and N-phenyl, N'-3-(triethoxysilyl)propyl urea.

Other suitable coupling agents include β-aminoethyl trichlorosilane, di-(3-aminopropyl) dichlorosilane, 3-isocyanatopropyl trichlorosilane, and 3,4-epoxybutyl tribromosilane. Other analogous compounds useful as couplers include primary or secondary amino, secondary amino, epoxy, isocyanato, hydroxy, and alkoxycarbonyl-containing Werner complexes such as ε-amino caproato chromic chloride, isocyanato chromic chloride, resorcylato chromic chloride, crotonato chromic chloride, sorbato chromic chloride, and 3,4-epoxybutyl chromic chloride; other organo-silicon compounds; substituted amines and amine salts; and substituted isocyanates, examples being 2-isocyanato phenol, 3-amino-propanol, and N-phenyl, N'-3-(aceto) propyl urea.

The instant process can also be conducted with reinforcing systems which use the carboxylated halosilanes described and claimed in the copending R. E. Miller application, Ser. No. 333,631, filed Dec. 26, 1963, the carboxyalkenyl halosilanes described and claimed in the copending R. E. Miller application, Ser. No. 333,680, filed Dec. 26, 1963, and also the phosphorus-containing coupling agents described and claimed in the copending R. E. Miller application, Ser. No. 333,630, filed Dec. 26,

1963, disclosures of which are incorporated herein by reference.

The amount of coupler with which the reinforcing agent is treated is relatively small. As little as one gram of coupling agent per 1000 grams of reinforcing agent produces a polymeric composition with physical properties, superior to those of a polymeric composition containing an untreated filler. Generally, quantities of coupler in the range of 3.0 to 20.0 grams per 1000 grams of reinforcing agent have been found most satisfactory although quantities in excess of that range may also be used with no detriment to the properties of the finished product.

Base-catalyzed substantially anhydrous lactam polymerizations are carried out by methods known to those skilled in the art using appropriate catalysts, promoters, regulators, stabilizers, curing agents, etc. necessary to achieve the polymerization of a selected lactam monomer. In addition to the above components, a reinforcing mineral adduct, prepared by reacting a mineral with a coupling agent, is added to the polymerization system along with a tetraalkyl silicate. The adduct may be formed prior to addition to the monomer or by an in situ reaction in the presence of the monomer.

The reinforced polymeric compositions are preferably prepared by the base-catalyzed polymerization of a lactam in the presence of a mineral treated with an amino-containing substituted oxysilane wherein the amino group acts as a regulator and is thereby incorporated into the molecular structure of the resultant polyamide. In such a polymerization, the treated reinforcing agent performs as the regulator as described in U.S. 3,017,392, previously incorporated herein by reference. The polymerization is advantageously carried out in a manner described in U.S. 3,017,391, U.S. 3,017,392, U.S. 3,018,273, or U.S. 3,028,369, utilizing the promoters and catalysts specified therein, wherein the treated mineral functions as a regulator in the polymerization process.

A procedure suitable for effectively binding the reinforcing agent to the polymer during polymerization comprises first mixing the lactam monomer, the amino-containing substituted oxysilane, the reinforcing medium, water and a crosslinking agent if desired. It is advisable to use a small quantity of water, less than 10% of the total weight of the mixture, so that its complete removal from the mixture is facilitated. About 1 to 5% water based on the weight of the mixture is usually sufficient. After thorough mixing, the mixture is heated to about 110-120° C., but less than 160°, to remove water and the hydrolyzable groups of the coupler. A vacuum may be applied to aid in removing the volatile materials. The temperature of the mixture is then adjusted to about 100° C. and the polymerization catalyst is added. Any of the catalysts known to be acceptable for base-catalyzed lactam polymerization are adequate; a preferred catalyst is an alkylmagnesium halide such as ethylmagnesium bromide. If a Grignard reagent is used, the temperature of the mixture is held at about 100° C. to permit the volatilization of the alkane formed by reaction of the Grignard with the lactam monomer. Following addition of the catalyst and removal of alkane if necessary, the tetraalkyl silicate and the promoter or initiator are added. Any of the promoters useful in base-catalyzed lactam polymerizations can be used. Examples include carbon monoxide; acyl caprolactams such as acetyl caprolactam; N,N'-substituted carbodimides such as diisopropylcarbodiimide and dicyclohexylcarbodiimide; and N,N-substituted cyanamides such as N,N diphenyl cyanamide. Other suitable promoters include lactams having attached to the imido group a heterocyclic substituent containing from one to three heterocyclic atoms wherein at least one of the heterocyclic atoms is a nitrogen atom and wherein the imido group of the lactam is attached to a carbon atom in the heterocyclic ring so situated that the nitrogen atom of the imido group and the nitrogen atom of the heterocyclic ring are connected by an odd number of conjugated carbon atoms. Examples of this class of promoters include: N-(2-pyridyl)-ε-caprolactam; N-(4-pyridyl)-ε-caprolactam; tris-N-(2,4,6-triazino)-ε-caprolactam; and N-(2-pyrazinyl)-ε-caprolactam. These promoters can be formed by the in situ reaction of a lactam with such compounds as 2-chloropyridine, 4-bromopyridine, 2-bromopyrazine, 2-methoxypyridine, 2-methoxypyrazine, 2,4,6-trichloro-s-triazine, 2-bromo-4,6-dichloro-s-triazine, and 2,4-dimethoxy-6-chloro-s-triazine. A preferred class of promoters, namely organic isocyanates, is described in detail in U.S. 3,028,369. Specific promoters preferred in our present polymerization include phenyl isocyanate, 2,4- and 2,6-tolylene diisocyanate, di-(p-isocyanatophenyl) methane, and a polyfunctional isocyanate such as Mondur MR manufactured by Mobay Chemical Company. Alternately the promoter may be added before the catalyst. Whichever procedure is followed, once the mixture contains the monomer, promoter, and catalyst, for most systems it is necessary to keep the temperature below 140° C., preferably below 120° C., to prevent polymerization until the mixture is cast. Some catalyst-promoter systems, such as the alkyl magnesium chloride-acetyl caprolactam system, will require even a further reduction in heat to less than 80° C. to prevent polymerization. It is also advisable when employing a reactive catalyst-promoter system to reduce the time intervening between the addition of the catalyst-promoter and the casting or molding of the mixture. After the mixture has been thoroughly stirred and allowed to come to equilibrium, the mixture is cast into a mold, which is preferably preheated, and polymerized for about one hour at 150° to 200° C. Other lengths of time and temperatures for polymerization are of course satisfactory and may be used with equal or nearly equal success. For instance, successful polymerizations can be achieved in five minutes or less under appropriate conditions well known in the art. Polymerization temperatures range from as low as 100° C. to 250° C. A preferred range useful here is 150–200° C. This range produces a rapid polymerization with products thereby obtained possessing the necessary degree of uniformity and reproducibility.

In an alternate process, a compound such as N-phenyl, N'-3-(triethoxysilyl)propyl urea may be reacted with a reinforcing agent and the adduct used in place of the promoter to achieve a chemical bond between the reinforcing agent and resulting polyamide.

Other processing techniques applicable to this invention include compression molding, transfer molding, and injection molding. To obtain injection molded compositions, we preferably employ a substantially linear polyamide reinforced with granular mineral particles.

The tetraalkyl orthosilicates used in the practice of this invention are conveniently prepared by an alcohol interchange which can be described as an alcoholysis reaction. In practice a lower tetraalkyl orthosilicate, e.g., tetraethyl orthosilicate, is heated with one to two molar equivalents of a higher alcohol in the presence of an alkaline catalyst. The equilibrium reaction is forced in the desired direction by removing the lower alcohol, e.g., ethanol, by distillation. The compositions formed by the reaction can be used without special purification since the trace quantities of alkaline catalyst complement the polymerization catalyst.

The interchange reaction can be conducted to prepare materials having the average composition of either one or two long chain alkoxy linkages, or the reaction can be adjusted to prepare compositions in between these points. Since each of the compositions is an equilibrium average, the extent of substitution of long alkyl chains for short alkyl chains depends upon the mole ratio of long-chain alcohol to short-chain tetraalkyl orthosilicate charged to the reactor.

The instant invention will be more clearly understood from the description of the following specific example. It will be understood that variations can be made in the procedures illustrated without departing from the invention.

Example 1

A glass reactor fitted with a thermometer and distilling head was charged with 153 g., 0.735 mole, tetraethyl orthosilicate, 178 g., 0.735 mole, n-hexadecanol, and one pellet anhydrous potassium hydroxide. The reactants were heated to a reaction temperature of 85–90° C. until 33 g. ethanol was collected, which represents nearly the stoichiometric quantity. A vacuum was applied to the product to strip out traces of ethanol from the product, cetyl triethyl orthosilicate.

Example 2

A glass reactor was charged with 104 g., 0.5 mole tetraethyl orthosilicate and 242 g., 1 mole, n-hexadecanol. As catalyst, 0.1 g. anhydrous sodium methylate was added and the materials heated to a temperature sufficiently high to drive off ethanol at a reasonable rate. In several hours, the weight of ethanol collected, 44.8 g., 0.975 mole, provided an indication that the desired product, dicetyl diethyl orthosilicate, was produced.

Example 3

A 3-liter glass reactor fitted with thermometer, motor-driven stirring device, and distillation head was charged with 925 g. caprolactam which was melted in an inert atmosphere of dry nitrogen. To the reactor was then added 17 ml. 3-aminopropyl triethoxysilane, 1575 g. of wallastonite, $CaSiO_3$, and 20 ml. $H_2O$. The reactants were thoroughly mixed and the temperature gradually increased to 150° C. as a slight vacuum was applied to the system to strip out water, the hydrolysis by-product, ethanol, and small amounts of the caprolactam. The stripping operation was continued at 150° C. until approximately 50 g. of caprolactam was collected in the receiver. The vacuum was released and the mixture cooled to about 110° C., then 31 ml. of a 3-molar solution of ethylmagnesium bromide in diethyl ether was added. Again a vacuum was applied to strip by product ethane and solvent ether from the reactor as the catalyst reacted. The vacuum was released and 25 g. dicetyl diethyl orthosilicate (prepared according to the procedure of Example 2) and 50 g. caprolactam that had previously been contacted with 10.8 ml. TD–80 were added. The TD–80 is an 80/20 mixture of 2,4- and 2,6-diisocyanatotoluene. The reactants were again stirred under reduced pressure as the temperature increased to 190° C. The material was poured into a mold, preheated to 180° C., said mold having the internal dimensions of 24 in. by 24 in. by ⅛ in. As soon as the casting step was completed the mold was heated to 200° C. and maintained at 200° for 1 hr. 15 min.

When the mold was opened it was observed that the reinforced polymeric composition was entirely free of bubbles, voids, and surface imperfections. Many previous attempts to prepare acceptable molded sheets in this mold from similar compositions, but without the added tetraalkyl orthosilicate, have been unsuccessful, because the finished product contained bubbles due to trapped gases contained in the highly viscous mix, and also had surface defects associated with poor wetting of the mold surfaces. We have found that castings, equivalent in appearance to those obtained when the orthosilicate is added, can only be obtained, without the orthosilicate addition, by decreasing the mineral loading. For example, in the instant case, surface appearance without orthosilicate was not satisfactory until the mineral loading was reduced to below 60 weight percent of the composition. On the other hand, when the orthosilicate is used, the loading can be increased to 65 weight percent and more, and the finished compositions have added strength and lower raw materials costs. The surprising properties of the orthosilicates as dispersing agents, viscosity reducing agents and as mold release agents are readily apparent in the production of large shapes of comparatively small thickness.

Example 4

A reinforced polycaprolactam composition was prepared according to the procedure of Example 3, except that feldspar was used as the mineral in a quantity sufficient to give a 73% concentration of feldspar in the finished product. The weights of reactants used was: 750 g. caprolactam, 1750 g. feldspar, 17 ml. coupling agent, methyl 3-(methyldichlorosilyl)isobutyrate, and, after the drying step, 25 ml. ethyl magnesium bromide solution was added at a reactant temperature of 110° C. and a vacuum again applied to remove ether and by-product ethane. To the reactants was then added 25 g. cetyl triethyl orthosilicate, prepared according to the process of Example 1, and 8.8 ml. TD–80 prereacted with 50 g. caprolactam. The system was heated to 200° C. under reduced pressure and poured into a mold cavity, 24" x 24" x ⅛", which had been preheated to 180° C. The material was held in the mold for 75 min. at 200° C. and then the mold cooled.

The product obtained in this run has a smooth, uniform appearance with no visible flaws or blemishes, and was easily removed from the mold.

In a companion run, conditions and reactants were selected to be identical to those used above, with the exception that the cetyl triethyl orthosilicate was omitted. The initial attempt to cast the slurry into a thin mold was unsuccessful, as the charge was too viscous to flow readily, even by application of an external mechanical vibratory device to the mold. The content of mineral reinforcing agent had to be reduced in this system to approximately 67% before a uniform casting could be prepared and even then it was found to have a poor surface.

Example 5

A reinforced polycaprolactam was prepared according to the general procedure of Example 3, but containing 80 weight percent mullite (an aluminum silicate) based on the weight of the final cast product. The reactants were formulated with 1 weight percent cetyl triethyl orthosilicate as dispersion agent and mold release agent.

The product prepared in this run had an original flexural strength of 17,300 p.s.i. and a flexural modulus of $2.7 \times 10^6$ p.s.i. A sample of this reinforced polymer was subjected to boiling water for 72 hrs. and at the end of this time the flexural strength was 8,400 p.s.i. and the flexural modulus was $0.87 \times 10^6$ p.s.i.

For purposes of comparison a sample of reinforced polycaprolactam was prepared by using the identical procedure and charge described above, with the sole exception that no cetyl triethyl orthosilicate was used. Difficulty was experienced in transferring the polymerization system to a mold since its viscosity was so high. Additionally, the mold interior had to be sprayed with a silicone type mold release agent. The casting had very good physical properties, however, having an orginal flexural strength of 22,700 p.s.i. and flexural modulus of $3.42 \times 10^6$ p.s.i. After a sample of this product was boiled in water for 72 hours, its flexural strength was 7,300 p.s.i. and its flexural modulus was $0.89 \times 10^6$ p.s.i.

The data included in this example indicate that processing improvements are obtained through the use of the tetraalkyl orthosilicates without sacrificing physical properties obtained through the reinforcing medium.

Example 6

The general procedure as described in Examples 3–5 was used to prepare reinforced polycaprolactam by the base-catalyzed polymerization of a system containing 0.60 volume fraction mullite and one weight percent of undecyl triethyl orthosilicate. The composition had good flow properties. The specimens cut from the 24" x 24" x ⅛" casting had excellent flexural strength and flexural modulus, and additionally had a pleasing smooth surface free of bubble marks or pits.

On the other hand, when the procedure of this example was duplicated, but with the omission of the orthosilicate from the charge, thin samples having a smooth uniform surface could not be obtained.

Example 7

A polymerization reactor was charged with 800 g. caprolactam, 17 ml. 3-aminopropyl triethoxysilane, 1700 g. No. 28 silica sand, and 10 ml. $H_2O$. These reactants were heated, with efficient mechanical mixing, to 150–160° C. and a vacuum was applied to the reactor to strip off volatiles, including water, ethanol from the hydrolyzed silane, and about 50 g. caprolactam. During the drying step the temperature was permitted to drop to about 110° C. at which point 27 ml. of the ethyl magnesium bromide catalyst in ether was added, and a vacuum again used to strip volatile materials including ether and ethane from the reactor. A prereacted mixture of 50 g. caprolactam and 9.4 ml. TD–80 (diisocyanotototoluene) was then added along with 30 g. cetyl triethyl orthosilicate. The mix was heated to 150° C. with agitation under a slight vacuum to remove any trapped bubbles. At 150° C. this mix was of pourable consistency, and it was easily poured into the 24″ x 24″ x ⅛″ mold, where it was maintained for 2 hours to prepare the polymer. The composition contained 68 weight percent or 0.48 volume fraction of silica sand. The casting had a smooth uniform surface, and was characterized by a flexural strength of 21,700 p.s.i. and a flexural modulus of $1.84 \times 10^6$ p.s.i.

In a companion run it was necessary to increase the percentage of monomer, when the orthosilicate was omitted, in order to prepare a pourable slurry. Thus, the procedure set forth in this example was duplicated, except that no orthosilicate dispersant and mold release was added. The slurry was too viscous at 150° C. to permit pouring into a mold. Incremental additions of dry caprolactam were made until it was judged that a pourable slurry was obtained. At this point, calculations indicated that the volume fraction of silica sand was but 0.42.

The casting had a porous surface, containing pits, spots and voids near the casting surface, its physical properties were not equivalent to the product prepared in the presence of the orthosilicate for several reasons. The content of reinforcing mineral is necessarily lower in order to achieve a pourable viscosity, and strength properties are reduced by the surface flaws. The product obtained from the casting had a flexural strength of 18,200 p.s.i. and a flexural modulus of $1.69 \times 10^6$ p.s.i.

Example 8

A reinforced polycaprolactam composition was prepared according to the procedure of Example 6, but with lauryl triethyl orthosilicate as the dispersing agent-mold release agent, in a quantity equal to 0.75 weight percent based on the total charge. A smooth casting was obtained having properties similar to the product obtained in Example 6, when an orthosilicate was included in the initial charge.

Example 9

A reinforced polycaprolactam was prepared according to the procedure of Example 3, wherein the casting slurry contained 4750 g. mullite (200) bound to the coupling agent, 3-aminopropyl triethoxysilane, 1500 g. caprolactam and 60 g. lauryl triethyl orthosilicate, 1.05 weight percent. A fluid slurry was obtained that could be poured at 150° C. and the product castings were free of surface defects or voids due to trapped gases within the slurry.

The improved mechanical properties of the reinforced polymers permit their use in many applications in which the unreinforced polymers are unsuitable, such as the fabrication of tables, chairs, and other furniture and furniture components, heavy duty equipment housings, automobile components, and building construction components. Further, the compositions of this invention are generally useful in those applications in which unreinforced polymers have been useful but where increased strength and rigidity are desirable features.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, these compositions can be "filled" with a mineral filler, i.e., with additional inorganic particulate material which is not chemically bound to the polymer as is the reinforcing agent. As an example, a mold may be loosely filled with a mixture of large (approximately 1 centimeter in diameter) irregular mineral particles and sand, and a monomer-mineral slurry as described in the preceding examples can be poured into the mold, thereby "wetting" the large particles in the mold and filling the spaces between the particles before polymerization occurs. In such a case the reinforced polymer binds the sand and larger aggregates together in much the same way as cement binds sand and gravel together to form a finished concrete. As an alternate method, the mineral aggregate in the mold may be treated with a suitable coupling agent prior to the introduction of the monomer-mineral slurry so that upon casting, the entire mineral mixture is chemically bound to the polymer, thereby producing a reinforced composition wherein the reinforcing medium can exceed 95% of the total composition.

It will be appreciated by those skilled in the art that viscosity reduction is required when using high loadings of reinforcing minerals, but on the other hand, mold release activity tends to be independent of reinforcement concentration. Therefore, we can obtain excellent mold release effects by using the tetraalkyl orthosilicates in the polymerization systems of monomers, e.g. lactams, even when no reinforcing agent is employed.

Accordingly, these and other modifications are contemplated which can be made without departing from the spirit of the described invention.

We claim:

1. A process for preparing reinforced polylactam comprising conducting a base-catalyzed, substantially anhydrous polymerization of a lactam in the presence of an inorganic reinforcing agent, a coupling agent containing at least one group capable of reacting with the lactam during polymerization and at least one group capable of reacting with said inorganic reinforcing agent, and a tetraalkyl orthosilicate.

2. A process according to claim 1 wherein said inorganic reinforcing agent has an alkaline surface.

3. A process according to claim 1 wherein said tetraalkyl orthosilicate is represented by the formula

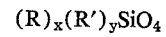

$$(R)_x(R')_y SiO_4$$

wherein R is an alkyl group of 8 to 20 carbon atoms, R′ is an alkyl group of one to four carbon atoms, x is an integer of 1 to 2, y is an integer of 2 to 3 and the sum of x and y is equal to 4.

4. A process according to claim 1 wherein said tetraalkyl orthosilicate is an equilibrium composition prepared by reacting from about one to about two moles of an aliphatic alcohol of 8 to 20 carbon atoms with one mole of a tetraalkyl orthosilicate, wherein each alkyl group contains from 1 to 4 carbon atoms, and removing from the reaction mixture the lower alkyl alcohols formed thereby.

5. A process according to claim 1 wherein said tetraalkyl orthosilicate is cetyl triethyl orthosilicate.

6. A process according to claim 1 wherein said tetraalkyl orthosilicate is lauryl triethyl orthosilicate.

7. A process according to claim 1 wherein said tetraalkyl orthosilicate is dicetyl diethyl orthosilicate.

8. A process according to claim 1 wherein said tetraalkyl orthosilicate is dilauryl diethyl orthosilicate.

9. A process according to claim 1 wherein said tetraalkyl orthosilicate is present in a quantity of about 0.01 to about 2% by weight of the total reaction mixture.

10. A process according to claim 9 wherein said tetraalkyl orthosilicate is soluble in said lactam but insoluble in polylactam, thereby migrating during the polymerization to the mold-polymer interface where it acts as a mold release agent.

11. A process according to claim 9 wherein said tetraalkyl orthosilicate is represented by the formula $$(R)_x(R')_y SnO_4$$

wherein R is an alkyl group of 8 to 20 carbon atoms, R' is an alkyl group of one to four carbon atoms, $x$ is an integer of 1 to 2, $y$ is an integer of 2 to 3 and the sum of $x$ and $y$ is equal to 4.

12. A process according to claim 9 wherein said tetraalkyl orthosilicate is an equilibrium composition prepared by reacting from about one to about two moles of an aliphatic alcohol of 8 to 20 carbon atoms with one mole of a tetraalkyl orthosilicate, wherein each alkyl group contains from 1 to 4 carbon atoms, and removing from the reaction mixture the lower alkyl alcohols formed thereby.

References Cited

UNITED STATES PATENTS

| | | | |
|---|---|---|---|
| 2,868,757 | 1/1959 | Symons | 260—78 |
| 2,874,139 | 2/1959 | Symons | 260—78 |
| 3,214,414 | 10/1965 | Waltersperger | 260—78 |
| 3,216,976 | 11/1965 | Schwartz et al. | 260—78 |

WILLIAM H. SHORT, *Primary Examiner.*

H. D. ANDERSON, *Assistant Examiner*